(12) United States Patent
Gaitonde et al.

(10) Patent No.: US 8,832,238 B2
(45) Date of Patent: Sep. 9, 2014

(54) RECORDING STATELESS IP ADDRESSES

(75) Inventors: Vithalprasad J. Gaitonde, Andhra Pradesh (IN); Mayur R. Naik, Andhra Pradesh (IN); Vikas Garg, Andhra Pradesh (IN); Pramit K. Bhuyan, Andhra Pradesh (IN); Arun Ramamurthi, Andhra Pradesh (IN)

(73) Assignee: Microsoft Corporation, Redmond, WA (US)

( * ) Notice: Subject to any disclaimer, the term of this patent is extended or adjusted under 35 U.S.C. 154(b) by 96 days.

(21) Appl. No.: 13/230,043

(22) Filed: Sep. 12, 2011

(65) Prior Publication Data

US 2013/0067043 A1    Mar. 14, 2013

(51) Int. Cl.
*G06F 15/16* (2006.01)
*H04L 29/12* (2006.01)

(52) U.S. Cl.
CPC ............ *H04L 61/35* (2013.01); *H04L 61/6022* (2013.01); *H04L 61/6059* (2013.01); *H04L 61/6004* (2013.01); *H04L 61/2015* (2013.01)
USPC .......................................... 709/220; 709/221

(58) Field of Classification Search
CPC . H04L 61/6059; H04L 61/6004; H04L 61/35; H04L 61/2015
USPC .......... 709/200–203, 217–227, 228, 229, 230
See application file for complete search history.

(56) References Cited

U.S. PATENT DOCUMENTS

| | | | |
|---|---|---|---|
| 6,806,813 B1 * | 10/2004 | Cheng et al. | 340/8.1 |
| 7,315,519 B2 * | 1/2008 | Sarikaya et al. | 370/310 |
| 7,433,943 B1 * | 10/2008 | Ford | 709/223 |
| 7,579,960 B2 * | 8/2009 | Cheng et al. | 340/8.1 |
| 7,693,163 B2 * | 4/2010 | Choo et al. | 370/401 |
| 7,738,882 B2 | 6/2010 | Dutta et al. | |
| 7,765,288 B2 * | 7/2010 | Bainbridge et al. | 709/223 |
| 7,768,975 B2 | 8/2010 | Dutta et al. | |
| 7,941,512 B2 | 5/2011 | Droms et al. | |
| 7,962,584 B2 * | 6/2011 | Xia et al. | 709/220 |
| 8,108,923 B1 * | 1/2012 | Satish et al. | 726/11 |
| 8,358,648 B1 * | 1/2013 | Breau et al. | 370/352 |
| 2005/0030194 A1 * | 2/2005 | Cheng et al. | 340/825.49 |

(Continued)

OTHER PUBLICATIONS

Tulloch, et al., "Windows@ 7 Resource Kit", Retrieved at <<http://ecx.images-amazon.com/images/I/A1y0UZ396wS.pdf>>, 2009, pp. 51.

(Continued)

*Primary Examiner* — Moustafa M Meky
(74) *Attorney, Agent, or Firm* — John Jardine; Andrew Sanders; Micky Minhas

(57) ABSTRACT

Techniques are described for recording stateless internet protocol (IP) addresses. A DHCP server may receive information requests and/or other communications from a stateless IPv6 client that can be employed to ascertain corresponding IP addresses generated by the client. In one approach, the DHCP server is configured to parse appropriate communications to find information indicative of a stateless IP address. This may include extracting a subnet prefix of the IPv6 client and an interface ID which identifies the specific network interface employed by the client for communications. The DHCP server uses this information to generate corresponding IP addresses. The DHCP server records the extracted information and/or generated addresses in its database (e.g., IP address event log). The DHCP server is then able to provide a count of clients and percentage utilization for a network using the recorded addressing information.

20 Claims, 6 Drawing Sheets

(56) References Cited

U.S. PATENT DOCUMENTS

| | | | |
|---|---|---|---|
| 2005/0030945 A1* | 2/2005 | Sarikaya et al. | 370/389 |
| 2006/0015513 A1 | 1/2006 | Poyhonen et al. | |
| 2006/0080728 A1 | 4/2006 | Wen et al. | |
| 2007/0180120 A1* | 8/2007 | Bainbridge et al. | 709/226 |
| 2008/0177830 A1* | 7/2008 | Vo et al. | 709/203 |
| 2008/0244054 A1* | 10/2008 | Schomp | 709/223 |
| 2009/0201834 A1 | 8/2009 | Xu | |
| 2010/0091684 A1 | 4/2010 | Winter et al. | |
| 2011/0055362 A1 | 3/2011 | Perez | |

OTHER PUBLICATIONS

Crawford, Matt, "Transmission of IPv6 Packets over Ethernet Networks", Network Working Group, Request for Comments 2464, Dec. 1998, 7 pgs.

* cited by examiner

RECORDING STATELESS IP ADDRESSES

BACKGROUND

Internet Protocol version 6 (IPv6) provides a stateless mode of operation where each node on the client can determine its own IPv6 address. This mode is referred to as the stateless address auto-configuration. In this mode, the clients are informed of the subnet ID (network prefix) by the router via the router advertisement. The clients use the subnet ID and generate a host portion (e.g., interface ID) that are combined to form their own IPv6 address. Given that clients determine their own IP address and are not allocated an IP address by a central authority like a dynamic host configuration protocol (DHCP) server, there may be no record of IPv6 clients and their identities (Media Access Control (MAC) address and IPv6 address) on the network. Accordingly, it may be difficult to get IP address utilization data (e.g., number of clients, percent of addresses utilized) in a stateless IPv6 deployment. As such, applications which employ addressing information on stateless IPv6 clients are unable to get such information from the DHCP server.

SUMMARY

Techniques are described for recording stateless internet protocol (IP) addresses. A DHCP server may receive information requests and/or other communications from a stateless IPv6 client that can be employed to ascertain corresponding IP addresses generated by the client. In one approach, the DHCP server is configured to parse appropriate communications to find information indicative of a stateless IP address. This may include extracting a subnet prefix of the IPv6 client and an interface ID which identifies the specific network interface employed by the client for communications. The DHCP server uses this information to generate corresponding IP addresses. The DHCP server records the extracted information and/or generated addresses in its database (e.g., IP address event log). The DHCP server is then able to provide a count of clients and percentage utilization for a network using the recorded addressing information.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

IPv6 enables a stateless mode of operation where each node on the client can determine its own IPv6 address. Because a DHCP server is not involved in this process, no centralized record of IPv6 stateless addresses is kept when clients create the addresses. Accordingly, it may be difficult to get IP address utilization data (number of clients, percent of addresses utilized) in a stateless IPv6 deployment.

As discussed in detail below, addressing information of stateless clients can be recorded in a DHCP database by using the interaction/contacts that the stateless clients have with the DHCP server for purposes other than getting addresses, such as obtaining configuration parameters (options). Although stateless clients can configure their own addresses in IPv6, the clients still may interact with a DHCP server to obtain additional configuration options. Accordingly, a DHCP server may receive various messages from a stateless IPv6 client that the DHCP server may examine to discover information indicative of a stateless IP address. Such information includes subnet prefixes and interface IDs that are used by IPv6 clients to create their stateless IP addresses in accordance with procedures established for IPv6. In particular, the DHCP server can examine fields in IP headers, DHCP messages (e.g., information requests) and/or DHCP relay messages that can be used to extract the subnet prefix of the IPv6 client and an interface ID. The DHCP server can record the extracted information in an IP address event log and/or reconstruct the addresses using the extracted information. The DHCP server is then able to provide a count of clients and percentage utilization using the addressing information recorded in the database.

In the following discussion, an example operating environment is first described that may employ techniques for recording stateless IP addresses described herein. Next, an example procedure is discussed, which may be implemented in the example environment as well as other environments. Consequently, performance of the procedures is not limited to the example environment/system and the example environment is not limited to performance of the example techniques. Lastly, details regarding example computing systems and devices are described that may be employed to implement one or more embodiments.

Operating Environment

Figure 1:
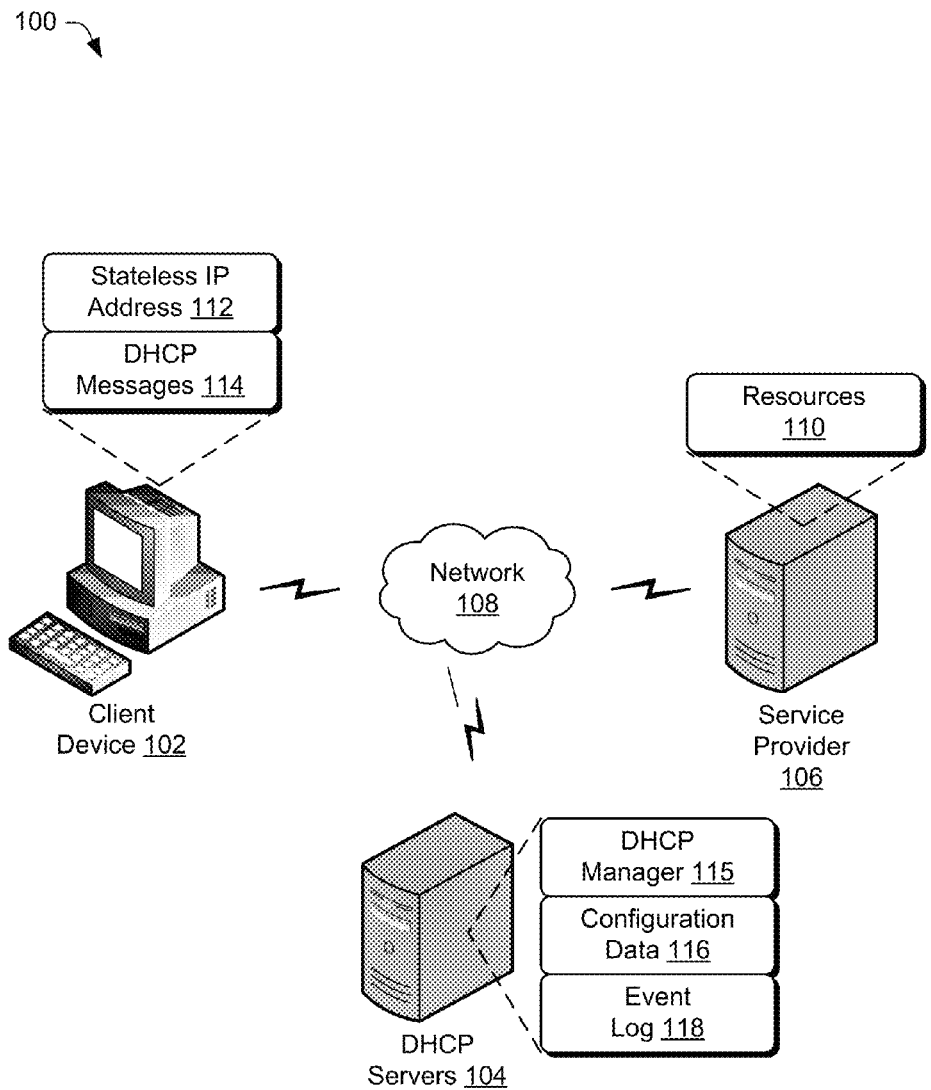
FIG. 1 is an illustration of an example operating environment in accordance with one or more embodiments.

FIG. 1 is an illustration of an environment 100 in an example implementation that is operable to employ techniques described herein. The illustrated environment 100 includes a client device 102, one or more dynamic host configuration protocol (DHCP) servers 104, and a service provider 106 that are communicatively coupled via a network 108. The client device 102, one or more DHCP servers 104, and service provider 106 may be implemented by one or more computing devices and also may be representative of one or more entities.

A computing device may be configured in a variety of ways. For example, a computing device may be configured as a computer that is capable of communicating over the network 108, such as a desktop computer, a mobile station, an entertainment appliance, a set-top box communicatively coupled to a display device, a wireless phone, a game console, and so forth. Thus, the computing device may range from full resource devices with substantial memory and processor resources (e.g., personal computers, game consoles) to a low-resource device with limited memory and/or processing resources (e.g., traditional set-top boxes, hand-held game consoles). Additionally, although a single computing device is shown in some instances, the computing device may be representative of a plurality of different devices, such as multiple servers utilized to perform operations such as by the service provider 106 and/or a DHCP service, and so on.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks.

The client device 102 may be configured with functionality to enable various communications over the network 108. For example, the client device 102 may include a browser or other suitable application to obtain and output webpages and/or other user interfaces from the service provider 106 over the network 108. The service provider 106 may manage various resources 110 that may be made accessible to clients over the network 108. Generally, resources 110 made accessible by a service provider 106 may include any suitable combination of services and/or content typically made available over a network by one or more providers. Some examples of services include, but are not limited to, a search service, an email service, an instant messaging service, an online productivity suite, and an authentication service to control access of clients to the resources 110. Content may include various combinations of text, multi-media streams, documents, application files, photos, audio/video files animations, images, web pages, web applications, device applications, content for display by a browser or other client application, and the like.

A client device 102 may access resources 110 provided by a service provider 106 through user accounts with the provider. An authentication service provided as a component of the service provider 106, as a standalone service, by a third party provider, or otherwise may be provided to authenticate clients to access particular accounts and therefore gain access to corresponding resources 110. Thus, to access resources 110, a client device 102 may provide a username and password that is authenticated by the authentication service. When the authentication is successful (e.g., the client "is who they say they are"), the authentication service may pass a token to enable access to corresponding resources. A single authentication may correspond to one or more resources, such that authentication to a single account by a "single sign-on" may provide access to individual resources, resources from multiple service providers 106, and/or to an entire suite of resources available from a service provider 106.

To interact in a network 108, the client device 102 may be configured to use an IP address that can be used for identification of the device as well as for locating the device and routing communications. In accordance with procedures established for IPv6, the client device 102 may be configured to establish its own stateless IP addresses 112 without relying upon a DHCP server 104 to get the address. Thus, the client is able to communicate or otherwise operate on a network right away without having to wait for a DHCP server 104 to perform dynamic configuration. As mentioned, though, client devices 102 typically communicate one or more DHCP messages 114 as shown in FIG. 1 to the DHCP server 104, such as to get further details for advanced configuration, network statistics, peer information, subnet data and so forth. Contacts of clients with the DHCP server 104, such as DHCP messages 114, can be used by the DHCP server 104 to enumerate stateless IP addresses used by clients, store data regarding the stateless addresses, and/or provide statistics such as IP address usage, client activity, and percent utilization for network management.

Generally, the DHCP server 104 represents functionality to implement DHCP techniques to dynamically assign and manage IP addresses for clients. To do so, the DHCP server 104 may include or otherwise make use of a DHCP Manager 115 that provides various functionality related to configuration of clients, IP address management, data logging, and other operations typically performed by the DHCP server 104. In addition to providing IP addresses and logs, the DHCP server 104 also provides other configuration data 116, which as mentioned can be requested by stateless clients (and other clients) through DHCP messages 114.

The dynamic host configuration protocol (DHCP) is an automatic configuration protocol that can be employed as an alternative to manually configuring devices with IP addresses. The DHCP server 104 and/or DHCP manager 115 may be used to provide addresses for clients that do not support or otherwise do not use the stateless addressing option of IPv6. IP addresses may be leased for a period of time after which the lease expires. The DHCP server 104 may be configured to maintain an IP address event log 118 to track leases of IP addresses allocated to different computers. For example, the event log 118 may match lease events (e.g., lease, renewal, expiration, etc.) for IP addresses to device identification information, such as MAC addresses. Further, the event log 118 can also be used to record stateless IP addresses that are determined using the techniques discussed above and below. Thus, the event log 118 may represent a common data store used to maintain records for clients that use stateless addressing as well as clients that rely upon the DHCP server 104 to obtain appropriate IP addresses.

Before discussing further details regarding techniques for recording stateless IP addresses, some relevant concepts of IPv6 and DHCPv6 are now briefly described to provide some context to the reader. In accordance with IPv6, a stateless IPv6 client obtains one or more global IPv6 addresses based on the procedure specified in IPv6 stateless address auto-configuration. The IPv6 client can determine two different addresses for each network interface in an established format as described just below:

Link Local Address

The link local address is self-determined by an IPv6 client. The client device 102 operates to form the address by using an interface identifier (interface ID also referred to as a host ID) and the link local subnet prefix FE80::0. The interface ID is a 64 bit identifier formed by using the link layer address (e.g., MAC address) of the network interface. The interface ID formed for an Ethernet interface is specified in section 4—Stateless Auto-configuration of the RFC "Transmission of IPv6 packets over Ethernet Networks" by Matt Crawford (1998), which is incorporated herein by reference in its entirety. The interface ID is obtained from the link layer address by inserting the hex characters FF-FE between the $3^{rd}$ and $4^{th}$ byte of the 6 byte MAC address and flipping the $2^{nd}$ least significant bit (LSB) in the first octet. This construction is specified by IPv6.

By way of example, for an Ethernet interface having a built-in address of, 34-56-78-9A-BC-DE, the interface ID would be 36-56-78-FF-FE-9A-BC-DE. Accordingly, the link local address in the above example will be FE80:3656:78FF:

FE9A:BCDE. An IPv6 client typically uses the link local address established as just described for DHCP communication.

Global Address

The global address is formed by a stateless IPv6 client by appending the interface ID with the subnet prefix of appropriate length. An IPv6 client can learn the global subnet prefix from the prefix information option contained in a router advertisement message. The client can obtain a router advertisement message by sending out a router advertisement solicitation message. Router advertisement is also periodically sent by the router(s) (e.g., broadcast) on a subnet to all clients on the subnet.

The prefix information options contained in the router advertisement may contain one or more subnet prefix(es) to be used by the clients on the subnet. In the case where the router advertises more than one prefix, the client forms multiple global addresses by appending the interface ID to the advertised subnet prefixes.

In the above example, if the router advertises a subnet prefix of 2FFE::0, the global IPv6 address used by the client for the interface is 2FFE::3656:78FF:FE9A:BCDE.

Preferred Lifetime and Valid Lifetime of an IPv6 Address

Each IPv6 subnet prefix advertised by the router in the router advertisement message may contain 2 timestamps—referred as preferred lifetime and valid lifetime. These two timestamps are contained in the router advertisement message for each advertised prefix. A preferred lifetime of a subnet prefix indicates how long the prefix can be used for communication on the network. A subnet prefix whose preferred lifetime has elapsed is considered "deprecated" and is no longer appropriate to use for new communications. However, existing communications which have already been established using this prefix can continue. The valid lifetime of a subnet prefix indicates the time after which the prefix becomes invalid on the subnet and can no longer be used for communication.

Client DUID

In DHCPv6 protocol, a client uniquely identifies itself to the DHCP server by the DHCP Unique Identifier (DUID) field in a DHCPv6 packet. The DHCPv6 specification allows the client to generate a DUID based on three different mechanisms: The link layer address plus time, a vendor assigned unique ID based on enterprise number and link layer address.

Based on the encoding of the DUID specified by DHCPv6, it is possible to extract the MAC address of the client from the encoded DUID in case of encoding as per the link layer address plus time and the link layer address listed above. In case of the DUID being encoded as per the vendor assigned unique ID based on enterprise number, the unique ID of the client can be determined.

Relay Forward Message

A DHCPv6 client sends DHCP messages 114 to an All_DHCP_Relay_Agents_and_Servers (FF02::1:2) multicast address. DHCPv6 relay in turn sends DHCP messages to All_DHCP_Servers (FF05::1:3). The DHCPv6 relay forward/reply message has the following fields:

Message Type: RELAY-FORW(12)/RELAY-REPL(13)
Hop Count: Number of relays which have forwarded the message
Link Address: Global address that will be used by the server to identify the link on which the client is located
Peer Address: Address of client/relay from which message was received
Options: A Relay message option which contains the client message in case of Relay-Forw message or Reply of server in case of Relay-repl message. It may also contain other relay agent options.

Each relay agent forwards a RELAY-FORW message (e.g., relay forward message) by encapsulating the received message in the options field of the RELAY-FORW message.

Information Request Message

A stateless IPv6 client typically requests a DHCP server 104 for option configuration. The option configuration is requested by the DHCPv6 client by sending an INFORMATION-REQUEST message (e.g., information request message) to the server. The options carried by the information request message are:

Client DUID
Option request option (which contains the options requested by the DHCP client)
User class
Vendor class
Vendor specific information The DHCP server 104 provides the options requested in an information request message (e.g., DHCP message 114) by the client device 102 in the option request option based on the subnet on which the client resides and the scope level options configured on the server. If there are no scope level option values set, the server level option values are returned to the client by the server.

Having considered the preceding contextual information for IPv6 and DHCPv6, consider now a discussion of implementation details regarding techniques for recording stateless IP addresses.

Recording Stateless IP Addresses

This section discusses example implementation details regarding techniques for recording stateless IP addresses.

As mentioned above, a DHCP Server 104 can be configured to extract relevant information regarding stateless IP address stateless IP address from DHCP messages 114 sent by a client and/or other contacts of a client with a DHCP server 104. This section discusses some illustrative examples to examine and process various DHCP messages 114 to obtain/record information indicative of corresponding stateless IP addresses for client devices 102.

In one approach, information indicative of corresponding stateless IP addresses can be obtained using DHCPv6 client information messages. Traditionally, DHCP servers 104 do not maintain a persistent record of the stateless clients in the DHCP database (e.g., event log 118). For a stateful client that requests an IPv6 address from the DHCP server 104, a record is maintained in the DHCP database which contains appropriate client information. In order to create an inventory of the DHCPv6 stateless clients, the DHCP server 104 is adapted to create records in the database for the stateless clients as well. To build such an inventory of the stateless clients, the client DUIDs and IPv6 addresses related to IPv6 clients are identified using the described techniques and recorded persistently in a data store, such as being stored in the example event log 118.

Although stateless clients do not interact with the DHCP server 104 to create IP addresses, one DCHP message 114 that is sent by a stateless DHCPv6 client to a DHCP server is the information request message. Accordingly, the DHCP server 104 can be adapted to obtain client DUIDs and IPv6 addresses from the information request message and/or the associated IP header.

In particular, the DHCP server 104 may examine the information request message, parse information contained therein, and identify appropriate information indicative of stateless IP address. For example, the client DUID is one of the options contained in the information request message and can be parsed directly out of the same. The client DUID can be used to uniquely identify a client device 102.

For clients behind a relay agent, the source address in the IPv6 header of the information request message contains at least one of the link local or global address of the client. If the global IPv6 address of the client is used, the global address can be directly obtained from the IP header and no further processing is performed. However, if the source address contains the link local address of the client, the DHCP server 104 also processes the link address contained in the relay forwarded information request message. By parsing the link address in this way, the DHCP server 104 is able to determine the global subnet prefix of the link to which the client device 102 is connected. The peer address field of the packet will also contain the client's link local address. The interface ID of the client can be obtained (backed-out) from the link local address, by reversing the established IPv6 procedure used to construct the link local address. Now, by appending the interface ID portion to the global subnet prefix determined from the link address, the IPv6 address of the client can be generated.

However, because the server may not have knowledge of the preferred lifetime and valid lifetime of the prefix used on the link, the server cannot necessarily determine the validity period of the client's IPv6 address determined by the process above. Also, in case of a subnet which has more than one prefix (e.g., router advertisement contains more than one prefix) the clients on the subnet may have multiple global unicast IPv6 addresses. By the procedure mentioned above, it may be possible to determine the global unicast addresses of the client provided the client sends an information request message for each subnet prefix. If the client sends just one information request message, the server may be able to determine one corresponding global unicast IPv6 address for the client.

Other clients may be on the same links as the DHCP server and may directly connect without using a relay agent. For client devices 102 on the same link as the DHCP server 104, DHCP messages 114 initiated by the client, in most cases will have the client's link local address in the source address field of the IPv6 header. This may provide the interface identifier, but may not directly provide a way to determine subnet information. Thus, in order to determine the global unicast address of the client, the DHCP server 104 can operate to discover prefixes applicable on the subnet. For client devices 102 directly connected (no relay) to the DHCP server 104, the server uses the subnet prefix in the static IP addresses to which the DHCP server 104 is bound. A client message is received through a DHCP network adapter that is associated with global subnet prefixes. Based on the prefixes of the subnet, the global unicast address of each client device 102 can be formed by appending the interface ID of the client to the subnet prefix(es). As mentioned earlier, the interface ID (e.g., Host ID) can be obtained from the link local address contained in the source address field of the IPv6 header.

In this manner, stateless IPv6 addresses can be computed and recorded for both clients behind a relay agent and clients that connect directly to a DHCP server 104. Further details regarding techniques for recording stateless IP addresses can be found in relation to the following example procedures.

Example Procedures

The following section describes example procedures for recording stateless IP addresses in accordance with one or more embodiments. Aspects of each of the procedures described herein may be implemented in hardware, firmware, or software, or a combination thereof. The procedures are shown as a set of blocks that specify operations performed by one or more devices and are not necessarily limited to the orders shown for performing the operations by the respective blocks. In at least some embodiments, the procedures may be performed by a suitably configured computing device, such as the example DHCP servers 104 described herein that include or otherwise make use of a DHCP manager 115 and an event log 118 as discussed previously.

Figure 2:
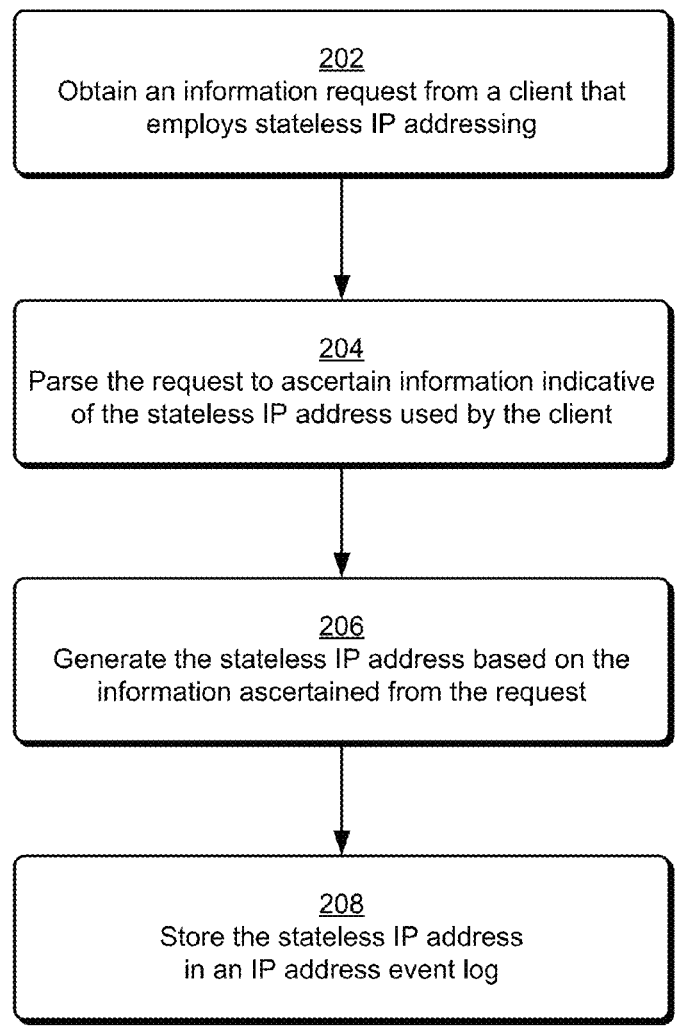
FIG. 2 is an illustration of an example procedure for recording stateless IP addresses in accordance with one or more embodiments.

FIG. 2 depicts an example procedure 200 for recording stateless IP addresses in accordance with one or more embodiments. An information request is obtained from a client that employs stateless IP addressing (block 202). For example, a DHCP server 104 may be implemented to obtain various DHCP messages 114 from a client device 102 including information request messages and/or relay forward messages described previously.

The request is parsed to ascertain information indicative of the stateless IP address used by the client (block 204). The DHCP server 104 through a DHCP manager 115 or otherwise may operate to process messages and ascertain relevant information that is indicative of a stateless IP address used by the client. This is the case, because the stateless IP addresses are constructed in an established format. Accordingly, the DHCP server 104 is adapted to look for certain fields used in messages from client devices 102. Such information includes DUIDs, global IPv6 addresses, link local address, interface IDs, MAC addresses, and so forth. In at least some case, the information comprises subnet information and interface identifier information that can be ascertained and extracted from DHCP messages 114 and/or other interaction of a client device 102 with the DHCP server 104.

The stateless IP address is generated based on the information ascertained from the request (block 206). For example, one or more items of information extracted from DHCP messages 114 can be combined in an appropriate manner to obtain a corresponding IPv6 address used by the client device 102. The DHCP server 104 may do so by following the established format for address designated by IPv6 and used by the clients to create their own addresses. Some illustrative examples of extracting data and creating corresponding addresses are discussed above and below in this document.

The stateless IP address is stored in an IP address event log (block 208). In general, the DHCP server 104 may be configured to maintain an event log 118 or other suitable database of IP address information for both stateless and stateful clients as discussed herein. The DHCP server 104 can include stateless IP addresses it determines for clients and/or the underlying data that is extracted from DHCP messages 114 and used to generate corresponding stateless IP addresses. In general, the event log 118 provides an inventory of unique IP addresses consumed by client devices 102.

A network administrator and/or other users may then be able to access the database to obtain IP address utilization data such as number of clients, percent of addresses utilized, and so forth. This may occur through an analysis interface exposed by the DHCP server 104 to access such information and that may be configured in various ways. For example, the analysis interface may be configured as a desktop application, a web based tool, a website, or other suitable interface through which users may access data recorded as an event log 118 or in another suitable database. The utilization data stored may include data both for stateful clients issued IP addresses directly through the DHCP server 104 and for stateless clients whose stateless IP addresses may be determined using the techniques discussed herein.

Figure 3:
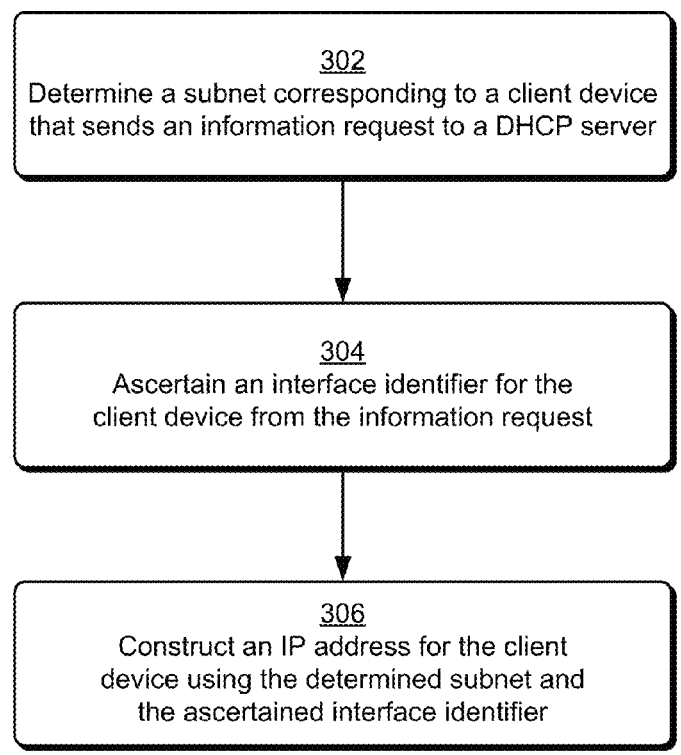
FIG. 3 is an illustration of an example procedure for constructing stateless IP addresses in accordance with one or more embodiments.

FIG. 3 depicts an example procedure 300 for constructing an IP address in accordance with one or more embodiments. A subnet corresponding to a client device that sends an information request to a DHCP server is determined (block 302). Generally speaking, subnet information for a client device 102 may be derived from an information request or other suitable contacts of a client device with a DHCP server 104. Communications of the client device 102 for example may contain an IPv6 header that carries subnet information for a subnet corresponding to the client device 102. In some cases, a link address corresponding to the subnet is encapsulated within relay forward messages for a client device 102 that makes use of one or more relay agents. Thus, a DHCP manager 115 may examine client communications to extract the link address from a relayed message. In the case of nested relay messages being encapsulated within a communication, the DHCP manager 115 may use the inner most relay message, which corresponds to the subnet of the originating client device 102. Accordingly, the appropriate subnet for a client device can be obtained based on information within the relay messages.

In another approach, a client device 102 that is not behind a relay agent sends communication through a network adapter of the DHCP server to which the client is directly connected. In this case, the subnet for the client device 102 can be derived using prefixes associated with the network adapter of the DHCP server. Here, the prefix(es) of the network adapter used for the communications correspond to the subnet of the client device 102. Accordingly, the prefix(es) can be used for the subnet portion of an IPv6 address for the client device 102. The prefix may include the first 64 bits of a global address for the network adapter of the DHCP server, which represents the corresponding subnet. Accordingly, the first 64 bits may be used as the subnet for constructing an IPv6 address for the client device.

A interface identifier for the client device is ascertained from the information request (block 304). As mentioned, communications of a client device 102 may contain an IPv6 header that includes a link local address of the client device 102. The link local address contains the interface identifier (e.g., host ID) of the client. Accordingly, the DHCP manager 115 may examine, parse and/or otherwise process the IPv6 header to obtain a corresponding interface identifier for the client device 102.

An IP address for the client device is constructed using the determined subnet and the ascertained interface identifier (block 306). Here, the DHCP manager 115 combines the determined subnet and the ascertained interface identifier to form the IPv6 address for the client. This may involve a straightforward concatenation of the subnet with the interface identifier.

Figure 4:
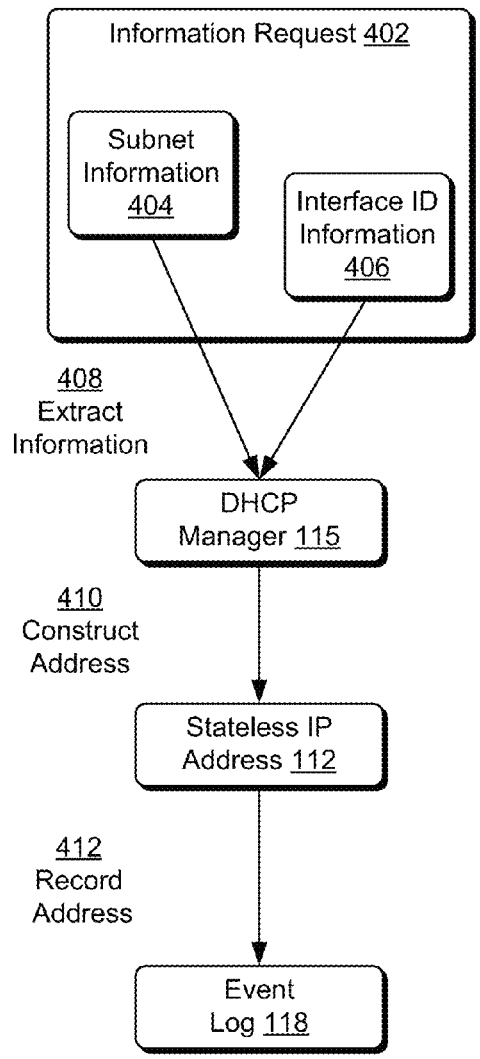
FIG. 4 depicts an example scenario for recording a stateless IP address in accordance with one or more embodiments.

To further illustrate, consider FIG. 4 which illustrates an example scenario for recording a stateless IP address in accordance with one or more embodiments. In the depicted example, a DHCP message 114 configured as an information request message 402 is depicted. The information request message 402 may be sent by a client device 102 to obtain configuration data 116 from a DHCP server 104, even though the client device 102 produces its own stateless IP addresses 112. The information request message 402 may be received through an appropriate network interface of the DHCP server. The information request message 402 may contain subnet information 404 and interface ID information 406 as described previously. In some instances, subnet information 404 may also be derived based upon prefixes associated with a network adapter of the DHCP server through which the information request message 402 is received. More generally, any suitable fields, parameters, messages, and/or identifiers available through contacts of a client device 102 with a DHCP server 104 may be employed to obtain corresponding subnet information 404 and interface ID information 406 for the client device 102.

As represented in FIG. 4, a DHCP manager 115 may operate at 408 to extract the subnet information 404 and interface ID information 406 from the information request message 402 or otherwise obtain equivalent information based on the information request message 402. The subnet information 404 and interface ID information 406 may be obtained in any suitable way from various kinds of communications and contacts, some examples of which are described herein. The DHCP manager 115 uses the extracted information at 410 to construct a corresponding stateless IP address 112 for the client device 102. This may occur by concatenating the determined subnet with the interface ID. In other words, the interface ID is appended to the subnet to create the IPv6 address. Then, at 412 the DHCP manager 115 records the constructed stateless IP address 112 in an event log 118. In this way, an inventory of unique IP addresses consumed by client devices 102 can be recorded.

Figure 5:
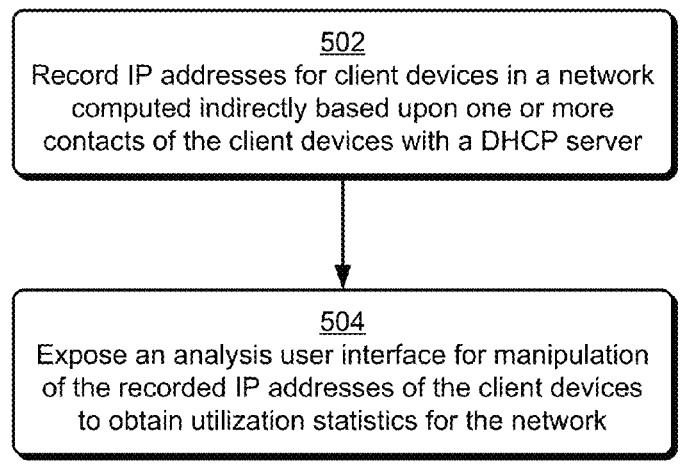
FIG. 5 is an illustration of an example procedure for using recorded IP addresses in accordance with one or more embodiments.

FIG. 5 depicts an example procedure 500 for using recorded IP address information in accordance with one or more embodiments. IP addresses for client devices in a network computed indirectly based upon one or more contacts of the client devices with a DHCP server are recorded (block 502). For example, based on different contacts of clients with the DHCP server 104, a DHCP manager 115 can extract information regarding IPv6 addresses indirectly. Generally, contacts may include information request messages, relay messages, DHCP messages, and/or other communications containing suitable information regarding IPv6 addresses. This includes but is not limited to subnet information 404 and interface ID information 406 discussed herein. The DHCP manager 115 may use information regarding IPv6 addresses extracted from various contacts to construct corresponding IPv6 addresses as previously described. The computation is considered indirect because typically the IPv6 address of a client is not directly available through contacts of the client with the DHCP server 104. Accordingly, the DHCP server 104 may be adapted, through a DHCP manager 115 or otherwise, to identify, process, extract, and otherwise obtain relevant pieces of information regarding IPv6 addresses that can be used to reproduce the IPv6 addresses. In this manner the DHCP server 104 is able to record and maintain an inventory of unique IP addresses consumed by client devices 102 in a network.

An analysis user interface is exposed for manipulation of the recorded IP addresses of the client devices to obtain utilization statistics for the network (block 504). Once recorded, the inventory of unique IP addresses consumed by client devices 102 can be manipulated in various ways to provide statistical information about a corresponding network. For example, an analysis user interface may be exposed to enable a network administrator and/or other users to access the inventory and manipulate information regarding IPv6 addresses in various ways. This includes providing address utilization data such as number of clients and percent of addresses utilized through the analysis interface. The analysis user interface may include various selectable controls and/or options to create and view reports, run analysis over a selected time frame, produce graphs and print outs, and otherwise manipulate the data to manage a corresponding network. As mentioned, the analysis interface may be provided in various ways such as a desktop application, a web based tool, a website, or other suitable interface through which users may access data recorded in an event log 118 or in another suitable database.

Having considered some example procedures, consider now a discussion of an example computing system that can be employed to implement various techniques for recording stateless IP addresses in one or more embodiments.

Example Computing System

Figure 6:
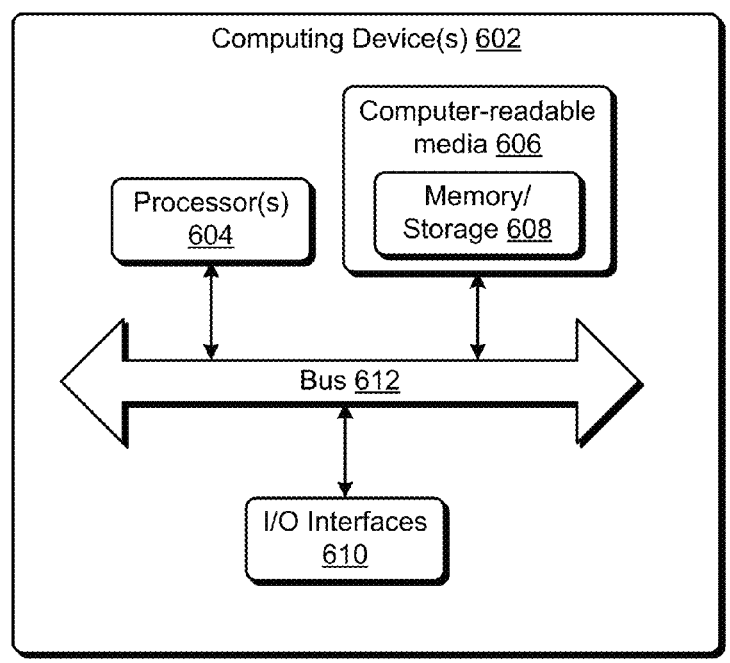
FIG. 6 is an illustration of an example computing system that can be employed to implement techniques to record stateless IP addresses in one or more embodiments.

FIG. 6 illustrates an example system generally at 600 that includes an example computing device 602 that is representative of one or more such computing systems and/or devices that may implement the various embodiments described above. The computing device 602 may be, for example, a server of a service provider 106, or DHCP server 104, a client device 102, a system on-chip, and/or any other suitable computing device or computing system.

The example computing device 602 includes one or more processors 604 or processing units, one or more computer-readable media 606 which may include one or more memory and/or storage components 608, one or more input/output (I/O) interfaces 610 for input/output (I/O) devices, and a bus 612 that allows the various components and devices to communicate one to another. Computer-readable media 606 and/or one or more I/O devices may be included as part of, or alternatively may be coupled to, the computing device 602. The bus 612 represents one or more of several types of bus structures, including a memory bus or memory controller, a peripheral bus, an accelerated graphics port, and a processor or local bus using any of a variety of bus architectures. The bus 612 may include wired and/or wireless buses.

The one or more processors 604 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. The memory/storage component 608 represents memory/storage capacity associated with one or more computer-readable media. The memory/storage component 608 may include volatile media (such as random access memory (RAM)) and/or nonvolatile media (such as read only memory (ROM), Flash memory, optical disks, magnetic disks, and so forth). The memory/storage component 608 may include fixed media (e.g., RAM, ROM, a fixed hard drive, etc.) as well as removable media (e.g., a Flash memory drive, a removable hard drive, an optical disk, and so forth).

Input/output interface(s) 610 allow a user to enter commands and information to computing device 602, and also allow information to be presented to the user and/or other components or devices using various input/output devices. Examples of input devices include a keyboard, a touchscreen display, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software, hardware (fixed logic circuitry), or program modules. Generally, such modules include routines, programs, objects, elements, components, data structures, and so forth that perform particular tasks or implement particular abstract data types. An implementation of these modules and techniques may be stored on or transmitted across some form of computer-readable media. The computer-readable media may include a variety of available medium or media that may be accessed by a computing device. By way of example, and not limitation, computer-readable media may include "computer-readable storage media" and "communication media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. Computer-readable storage media also includes hardware elements having instructions, modules, and/or fixed device logic implemented in a hardware form that may be employed in some embodiments to implement aspects of the described techniques.

The computer-readable storage media includes volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, hardware elements (e.g., fixed logic) of an integrated circuit or chip, or other storage device, tangible media, or article of manufacture suitable to store the desired information and which may be accessed by a computer.

"Communication media" may refer to a signal bearing medium that is configured to transmit instructions to the hardware of the computing device, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

Combinations of any of the above are also included within the scope of computer-readable media. Accordingly, software, hardware, or program modules, including the resources 110, DHCP manager 115, services, device applications, analysis tools/interface, and other program modules, may be implemented as one or more instructions and/or logic embodied on some form of computer-readable media.

Accordingly, particular modules, functionality, components, and techniques described herein may be implemented in software, hardware, firmware and/or combinations thereof. The computing device 602 may be configured to implement particular instructions and/or functions corresponding to the software and/or hardware modules implemented on computer-readable media. The instructions and/or functions may be executable/operable by one or more articles of manufacture (for example, one or more computing devices 602 and/or processors 604) to implement techniques related to recording stateless IP addresses, as well as other techniques. Such techniques include, but are not limited to, the example procedures described herein. Thus, computer-readable media may be configured to store or otherwise provide instructions that, when executed by one or more devices described herein, cause various techniques related to recording stateless IP addresses.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer readable storage device storing instructions that, when executed by one or more components of a computing system, implement a dynamic host configuration protocol (DHCP) manager configured to perform operations including:
   recording internet protocol (IP) addresses for client devices in a network computed indirectly based upon one or more contacts of the client devices with a DHCP server by:
      extracting a subnet prefix and an interface identifier received in an information request from each of the client devices, wherein the information request does not comprise a request for an IP address;
      computing an IP address for at least a particular client device by concatenating a subnet for the particular client device with an interface identifier for the particular client device to generate the IP address for the particular client device; and
      storing the extracted subnet prefix and interface identifier in an event log; and
   exposing an analysis user interface for manipulation of the recorded IP addresses of the client devices to obtain utilization statistics for the network.

2. The computer readable storage device of claim 1, wherein the DHCP manager is further configured to perform operations including:
   computing the IP addresses for the client devices based upon information indicative of the IP addresses contained in DHCP messages obtained at the DHCP server from the client devices.

3. The computer readable storage device of claim 1, wherein the one or more contacts comprise information request messages sent by the client devices to obtain configuration data for the network from the DHCP server.

4. The computer readable storage device of claim 1, wherein the interface identifier for the particular client device is ascertained from a local link address corresponding to the particular client device that is contained in a header field of a DHCP message sent to the DHCP server through the relay agent, and the subnet for the particular client device is determined from a link address contained in a relay forward message produced when the DHCP message is forwarded by the relay agent.

5. The computer readable storage device of claim 4, wherein the DHCP manager is further configured to perform operations for computing an IP address for another client device connected directly to the DHCP server including:
   ascertaining an interface identifier for the other client device from a local link address corresponding to the other client device that is contained in a header field of a DHCP message sent by the other client device to the DHCP server;
   determining a subnet for the other client device from a subnet prefix associated with a network adapter of the DHCP server that receives the DHCP message sent by the other client device; and
   concatenating the determined subnet with the ascertained interface identifier for the other client device to generate the IP address for the other client device.

6. The computer readable storage device of claim 1, wherein recording the IP addresses comprises storing the IP addresses that are computed in a database maintained by the DHCP server to provide an inventory of consumed IP addresses accessible by a network administrator of the network.

7. The computer readable storage device of claim 1, wherein the utilization statistics comprises a percentage of utilized addresses.

8. A method comprising:
   recording, by a computing device, internet protocol (IP) addresses for one or more client devices in a network, wherein the IP addresses are computed indirectly based upon one or more contacts of the one or more client devices with a dynamic host configuration protocol (DHCP) server by:
      extracting a subnet prefix and an interface identifier received in an information request from each of the client devices, wherein the information request does not comprise a request for an IP address;
      computing an IP address for at least a particular client device by concatenating a subnet for the particular client device with an interface identifier for the particular client device to generate the IP address for the particular client device; and
      storing the extracted subnet prefix and interface identifier in an event log;
   recording internet protocol (IP) addresses for client devices in a network computed indirectly based upon one or more contacts of the client devices with a DHCP server; and
   providing an analysis user interface for manipulation of the recorded IP addresses of the one or more client devices to obtain utilization statistics for the network.

9. The method of claim 8, further comprising:
   computing the IP addresses for the one or more client devices based upon information indicative of the IP addresses contained in DHCP messages obtained at the DHCP server from the one or more client devices.

10. The method of claim 8, wherein the one or more contacts comprise information request messages sent by the one or more client devices to obtain configuration data for the network from the DHCP server.

11. The method of claim 8, further comprising:
    ascertaining the interface identifier for the particular client device from a local link address corresponding to the particular client device that is contained in a header field of a DHCP message sent to the DHCP server through the relay agent; and
    determining the subnet for the particular client device from a link address contained in a relay forward message produced when the DHCP message is forwarded by the relay agent.

12. The method of claim 11, further comprising:
    ascertaining an interface identifier for a second client device from a local link address corresponding to the second client device that is contained in a header field of a DHCP message sent by the second client device to the DHCP server;
    determining a subnet for the second client device from a subnet prefix associated with a network adapter of the DHCP server that receives the DHCP message sent by the second client device; and concatenating the determined subnet with the ascertained interface identifier for the second client device to generate the IP address for the second client device.

13. The method of claim 8, wherein recording the IP addresses comprises storing the IP addresses that are computed in a database maintained by the DHCP server to provide an inventory of consumed IP addresses accessible by a network administrator of the network.

14. The method of claim 8, wherein the analysis user interface provides address utilization data comprising a percentage of utilized addresses.

15. A system comprising:
a processor; and
a memory coupled to the processor, the memory for storing instructions which, when executed by the processor, perform a method, the method comprising:
   recording internet protocol (IP) addresses for one or more client devices in a network, wherein the IP addresses are computed indirectly based upon one or more contacts of the one or more client devices with a dynamic host configuration protocol (DHCP) server by:
      extracting a subnet prefix and an interface identifier received in an information request from each of the client devices, wherein the information request does not comprise a request for an IP address;
      computing an IP address for at least a particular client device by concatenating a subnet for the particular client device with an interface identifier for the particular client device to generate the IP address for the particular client device; and
      storing the extracted subnet prefix and interface identifier in an event log; and
   providing an analysis user interface for manipulation of the recorded IP addresses of the one or more client devices to obtain utilization statistics for the network.

16. The system of claim 15, further comprising instructions for:
computing the IP addresses for the one or more client devices based upon information indicative of the IP addresses contained in DHCP messages obtained at the DHCP server from the one or more client devices.

17. The system of claim 15, wherein the one or more contacts comprise information request messages sent by the one or more client devices to obtain configuration data for the network from the DHCP server.

18. The system of claim 15, further comprising instructions for:
ascertaining the interface identifier for the particular client device from a local link address corresponding to the particular client device that is contained in a header field of a DHCP message sent to the DHCP server through the relay agent; and
determining the subnet for the particular client device from a link address contained in a relay forward message produced when the DHCP message is forwarded by the relay agent.

19. The system of claim 18, further comprising instructions for:
ascertaining an interface identifier for a second client device from a local link address corresponding to the second client device that is contained in a header field of a DHCP message sent by the second client device to the DHCP server;
determining a subnet for the second client device from a subnet prefix associated with a network adapter of the DHCP server that receives the DHCP message sent by the second client device; and
concatenating the determined subnet with the ascertained interface identifier for the second client device to generate the IP address for the second client device.

20. The system of claim 15, wherein recording the IP addresses comprises storing the IP addresses that are computed in a database maintained by the DHCP server to provide an inventory of consumed IP addresses accessible by a network administrator of the network.

* * * * *